(12) United States Patent
Shi et al.

(10) Patent No.: US 12,160,103 B2
(45) Date of Patent: Dec. 3, 2024

(54) DRIVER DEVICE, METHOD FOR MONITORING DRIVER DEVICE, AND POWER SUPPLY DEVICE

(71) Applicant: Infineon Technologies Austria AG, Villach (AT)

(72) Inventors: Sanbao Shi, Shenzhen (CN); Tangshun Wu, Shenzhen (CN)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 321 days.

(21) Appl. No.: 17/715,320

(22) Filed: Apr. 7, 2022

(65) Prior Publication Data

US 2022/0329072 A1 Oct. 13, 2022

(30) Foreign Application Priority Data

Apr. 7, 2021 (CN) .......................... 202110371605.1

(51) Int. Cl.
*H02J 3/00* (2006.01)
*H02M 1/00* (2007.01)
*H02M 1/084* (2006.01)
*H02M 1/32* (2007.01)

(52) U.S. Cl.
CPC ......... *H02J 3/0012* (2020.01); *H02M 1/0009* (2021.05); *H02M 1/0845* (2013.01); *H02M 1/325* (2021.05)

(58) Field of Classification Search
CPC .. H02J 3/0012; H02M 1/0009; H02M 1/0845; H02M 1/325; H02M 1/08; H02M 1/32; H02M 7/5387; H02M 1/0012; G05B 19/0423; G05B 2219/25257
USPC ....................................................... 324/764.01
See application file for complete search history.

(56) References Cited

U.S. PATENT DOCUMENTS

| | | | | |
|---|---|---|---|---|
| 5,185,736 A | * | 2/1993 | Tyrrell | H04J 3/1611 370/359 |
| 5,818,678 A | * | 10/1998 | Berg | H01H 47/325 361/170 |
| 7,458,911 B2 | * | 12/2008 | Krisher | B60K 23/04 475/86 |
| 7,629,756 B2 | * | 12/2009 | Murrell | H02P 5/74 318/494 |
| 7,813,101 B2 | * | 10/2010 | Morikawa | F16K 31/0675 361/160 |
| 10,432,118 B2 | * | 10/2019 | Ogawa | H02P 7/03 |
| 2008/0086250 A1 | * | 4/2008 | Kuivenhoven | B60R 21/0173 701/45 |

* cited by examiner

*Primary Examiner* — Christopher P McAndrew
(74) *Attorney, Agent, or Firm* — Cooper Legal Group LLC

(57) ABSTRACT

A driver device, a method for monitoring a driver device, and a power supply device are disclosed. The driver device includes a controller and a driver module. The driver module includes a voltage divider loop and a plurality of drivers. The voltage divider loop includes a pull-down resistor and one or more corresponding resistors connected to each of the plurality of drivers, where the pull-down resistor and the one or more corresponding resistors are coupled to a power supply via a first node, and the first node is coupled to the controller.

21 Claims, 7 Drawing Sheets

Driver device 200

DRIVER DEVICE, METHOD FOR MONITORING DRIVER DEVICE, AND POWER SUPPLY DEVICE

RELATED APPLICATION

This application claims priority to Chinese Patent Application No. 202110371605.1, filed on Apr. 7, 2021, entitled "DRIVER DEVICE, METHOD FOR MONITORING DRIVER DEVICE, AND POWER SUPPLY DEVICE", which is incorporated by reference herein in its entirety.

TECHNICAL FIELD

The disclosure relates to the field of electronic circuits, for example, to fault monitoring for a driver.

SUMMARY

A general purpose driver (GPD) is used for controlling a power board to supply power to a load. FIG. 1A is a schematic block diagram of a GPD. Generally, a microcontroller unit (MCU) board provides a pulse width modulated (PWM) signal to drive power components on a power board, and monitors a fault signal from a gate driver board.

FIG. 1B shows a detailed structure of a gate driver board. As shown in FIG. 1B, when one or more drivers in the gate driver board are faulty, the MCU board receives, via an I/O (input/output) pin, a fault signal from the gate driver board. The fault signal is a high or low logic level signal. Therefore, the MCU board cannot learn, based on the fault signal, which driver or drivers in the gate driver board are faulty. In addition, the MCU board cannot learn which power component or power components connected following the driver or drivers are faulty.

A solution is to make an MCU detect as many fault signals from the gate driver board as a quantity of drivers. However, this increases system complexity and increases costs of the MCU and wiring due to more pins.

The following presents a brief summary of the disclosure in order to provide a basic understanding of some aspects of the disclosure. It should be understood that this summary is not an exhaustive summary of the disclosure. The summary is not intended to determine the key or important part of the disclosure, nor to limit the scope of the disclosure. The object thereof is merely to give some concepts in a simplified form, as a prelude to the more detailed description presented later.

A first aspect of the present disclosure provides a driver device, including: a controller; and a driver module including a voltage divider loop and a plurality of drivers, where the voltage divider loop includes a pull-down resistor and one or more corresponding resistors connected to each of the plurality of drivers. The pull-down resistor and the one or more corresponding resistors are coupled to a power supply via a first node, and the first node is coupled to the controller.

In some examples, the controller detects, based on a voltage signal received from the first node, whether branches in which the plurality of drivers are respectively located are in normal working state.

In some examples, the controller detects at least one faulty branch based on a reference voltage and a voltage value of the received voltage signal, where the reference voltage is based on a voltage value, across the first node, that is measured during initialization of the driver device and when the voltage divider loop and the plurality of drivers are in normal working state (e.g., the voltage value is measured at a time that is during initialization of the driver device, wherein, at the time, the plurality of drivers are in normal working state). A fault of the branch includes: a fault of a driver on the branch, and/or a fault of another component (e.g., a component other than the driver) that is on the branch and/or is coupled to the driver, where the another component is, for example, a power component.

In some examples, the controller detects the at least one faulty branch based on a difference between the reference voltage and the voltage value of the received voltage signal or a predetermined range of the difference.

In some examples, a table is stored on the controller (e.g., the controller contains the table), and the table includes a voltage value across the first node and a branch in which a driver (e.g., one driver) of the plurality of drivers is located, wherein the voltage value across the first node and the branch is measured when the branch (in which the driver, such as the one driver, of the plurality of drivers is located) is faulty.

In some examples, the table further includes a voltage value across the first node and branches in which two or more drivers of the plurality of drivers are located, wherein the voltage value across the first node and the branches is measured when the branches (in which the two or more drivers of the plurality of drivers are located) are faulty.

In some examples, each voltage value included in the table is able to change within a predetermined range between an upper voltage limit and a lower voltage limit.

In some examples, the controller determines the at least one faulty branch by looking up the table based on the voltage value of the received voltage signal.

In some examples, the one or more corresponding resistors comprise a plurality of sets of corresponding resistors. For each driver of the plurality of drivers, the plurality of sets of corresponding resistors comprises a set of one or more corresponding resistors connected to the driver. A first terminal (e.g., one terminal) of a first set of one or more corresponding resistors of the plurality of sets of corresponding resistors is connected to a first terminal of a corresponding driver in the plurality of drivers and a second terminal (e.g., one terminal) of the first set of one or more corresponding resistors is connected to the first node. A second terminal of the corresponding driver in the plurality of drivers is coupled to ground.

In some examples, a resistance value of the first set of one or more corresponding resistors connected to the corresponding driver of the plurality of drivers is different from a resistance value of a second set of one or more corresponding resistors (of the plurality of sets of corresponding resistors, for example) connected to a second driver of the plurality of drivers.

In some examples, when a branch in which at least one driver of the plurality of drivers is located is faulty, the voltage value of the voltage signal received by the controller is dependent on a parallel resistance value of the pull-down resistor and a set of one or more corresponding resistors, of the plurality of sets of corresponding resistors, connected to the at least one driver.

In some examples, the pull-down resistor and the one or more corresponding resistors comprise (e.g., consist of) a resistor array, and resistors in the resistor array (e.g., all resistors in the resistor array) are connected in series and have about a same resistance value (e.g., resistance values of some and/or all resistors in the resistor array may be about the same as each other). A terminal (e.g., one terminal) of an initial resistor in the resistor array (e.g., sequentially the first resistor in the resistor array) is connected to the first node and a terminal (e.g., one terminal) of a last resistor in the resistor array (e.g., sequentially the last resistor in the resistor array) is coupled to ground. Each driver of the plurality of drivers comprises a first terminal connected between a corresponding pair of resistors in the resistor array and a second terminal coupled to ground.

In some examples, when a branch in which a driver (e.g., one driver) of the plurality of drivers is located is faulty, the voltage value of the voltage signal received by the controller is dependent on a quantity of resistors in the resistor array that are connected in series and connected to the driver (e.g., the one driver).

In some examples, the power supply is a constant current source, and the constant current source is connected to the first node.

In some examples, the power supply is a voltage source, the voltage divider loop further includes a pull-up resistor, and the first node is coupled to the voltage source via the pull-up resistor.

Another aspect of the present disclosure provides a power supply device, including: a driver device described above; and a power module, driven by a control signal provided by a controller to supply power to a load.

Still another aspect of the present disclosure provides a method for monitoring a driver device described above, and the method includes: receiving, by a controller, a voltage signal from a first node; and detecting, by the controller, based on the received voltage signal, at least one faulty branch in a plurality of branches in which a plurality of drivers are respectively located.

In some examples, the method further includes: detecting, by the controller and based on a reference voltage and a voltage value of the received voltage signal, the at least one faulty branch, where the reference voltage is based on a voltage value across the first node, and where the voltage value across the first node is measured during initialization of the driver device and when a voltage divider loop and the plurality of drivers are in normal working state (e.g., the voltage value is measured at a time that is during initialization of the driver device, wherein, at the time, the plurality of drivers are in normal working state).

In some examples, the method further includes: determining, by the controller, the at least one faulty branch by looking up, based on the voltage value of the received voltage signal, a table stored (e.g., contained) in the controller, where the table includes a voltage value across the first node and a branch in which a driver (e.g., one driver) of the plurality of drivers is located, wherein the voltage value across the first node and the branch is measured when the branch (in which the driver, such as the one driver, of the plurality of drivers is located) is faulty.

In some examples, the table further includes a voltage value across the first node and branches in which two or more drivers of the plurality of drivers are located, wherein the voltage value across the first node and the branches is measured when the branches (in which the two or more drivers of the plurality of drivers are located) are faulty.

In some examples, each voltage value included in the table includes a corresponding upper voltage limit and lower voltage limit.

In some examples, when at least one branch is faulty, the voltage value of the voltage signal received by the controller is dependent on a parallel resistance value of the pull-down resistor and a corresponding resistor of at least one driver that are in the voltage divider loop.

In some examples, when one branch is faulty, the voltage value of the voltage signal received by the controller is dependent on a quantity of resistors in voltage divider loop that are connected in series and connected to one driver.

The techniques and/or solutions provided in the present disclosure makes it possible to detect, in a simple and cost-effective manner, which driver or drivers in a drive board are faulty, or which power component or power components connected following the driver or drivers are faulty.

These and other advantages of the present disclosure will become more apparent by describing in detail the preferred embodiments of the present disclosure in conjunction with the accompanying drawings.

BRIEF DESCRIPTION OF THE DRAWINGS

To further clarify the above and other advantages and features of the disclosure, the embodiments of the disclosure are further described below in detail in conjunction with the accompanying drawings. The accompanying drawings, together with the following detailed description, are incorporated in and form a part of the specification. Elements having identical functions and structures are denoted by identical reference numerals. It should be understood that these drawings only depict typical examples of the disclosure and should not be considered as limiting to the scope of the disclosure. In the drawings.

DETAILED DESCRIPTION

Exemplary embodiments of the disclosure will be described below in conjunction with the accompanying drawings. For the purpose of clarity and conciseness, not all features of actual embodiments are described in the specification. It should be appreciated, however, that in the development of any such actual embodiments, numerous decisions specific to the embodiments must be made to achieve specific goals of developers, such as compliance with system-and business-related constraints, which may change as the embodiments differ. Moreover, it should be appreciated that such development efforts may be complex and time-consuming, but are merely a routine undertaking for those skilled in the art benefiting from the disclosure.

It is also noted herein that, in order to avoid obscuring the disclosure with unnecessary details, only device structures and/or process acts that are closely related to the solution of the disclosure are shown in the accompanying drawings, and other details that have little relation to the disclosure are omitted.

Figure 2:
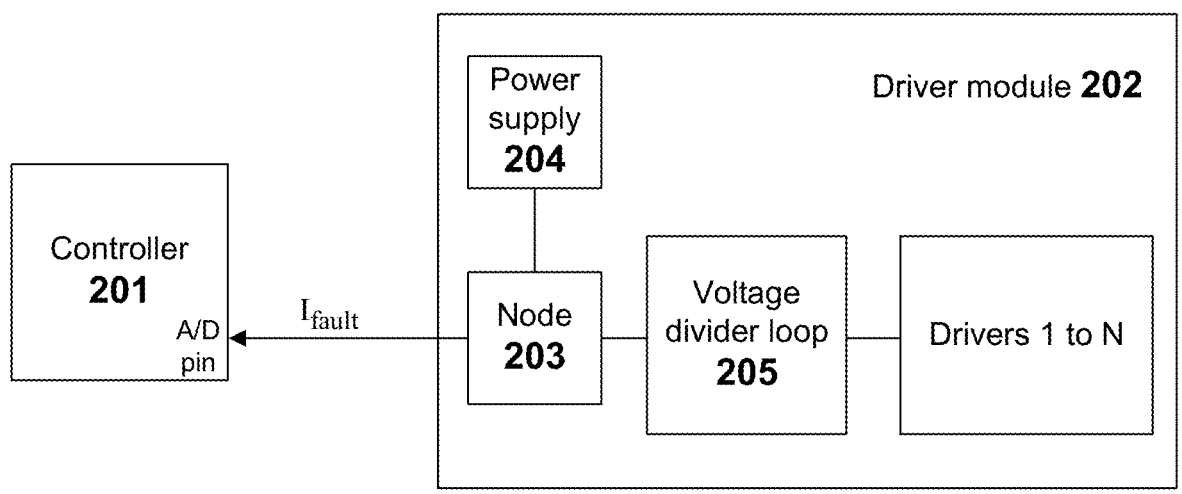
FIG. 2 is a schematic block diagram of a driver device according to an embodiment.

A driver device 200 according to an embodiment of the present disclosure is described below in conjunction with FIG. 2. As shown in FIG. 2, the driver device 200 includes a controller 201 and a driver module 202 connected to the controller 201. The driver module 202 includes a power supply 204, a node 203, a voltage divider loop 205, and drivers 1 to N, where N is an integer greater than 1. When one or more drivers in the drivers 1 to N are faulty, the controller 201 determines which driver or drivers are faulty by comparing a voltage value of a fault signal $I_{fault}$ (e.g., a voltage signal) received from the node 203 at an A/D (analog-to-digital conversion) pin with a reference voltage.

Figure 1A:
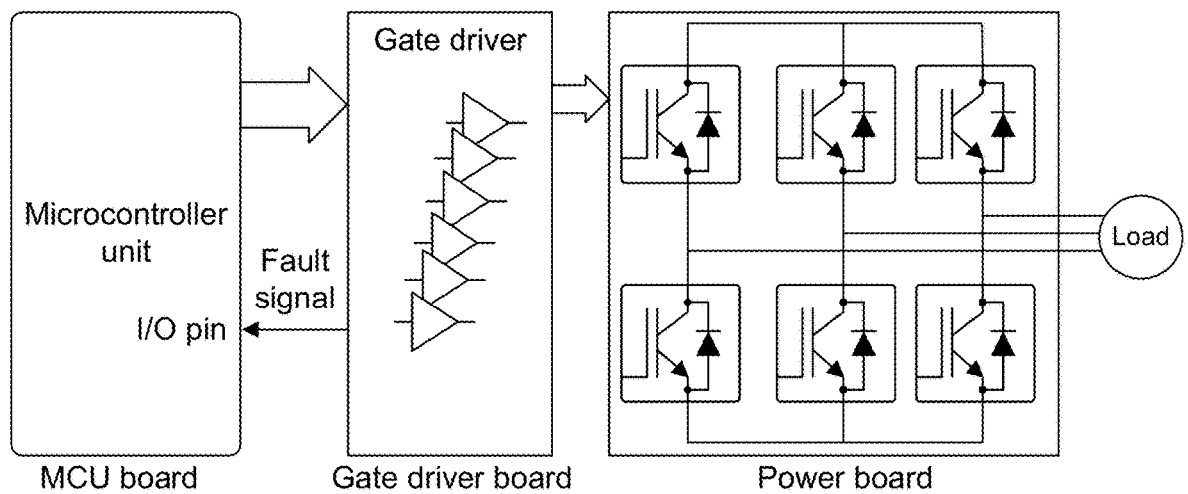
FIG. 1A is a schematic block diagram of a general purpose driver.
Figure 1B:
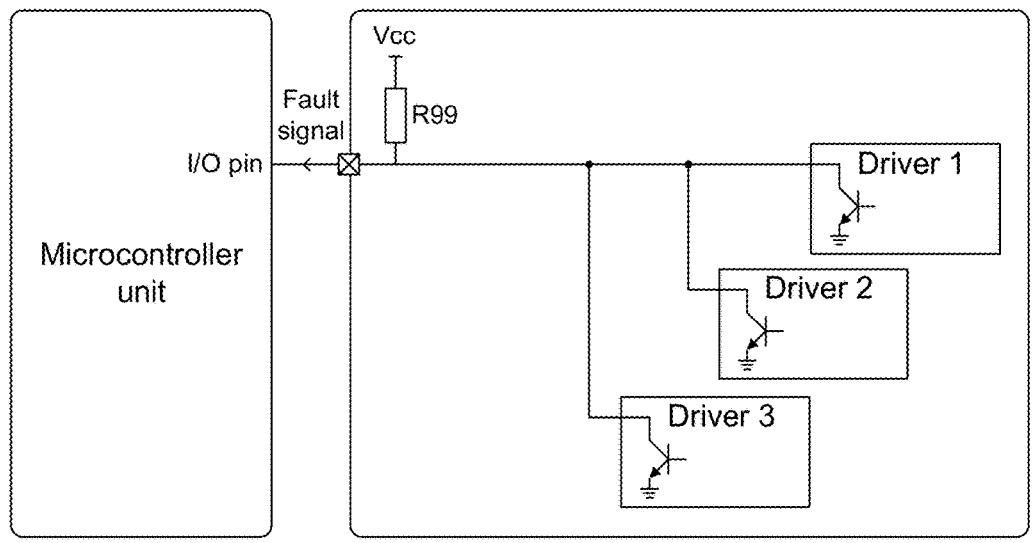
FIG. 1B shows a detailed structure of a gate driver board.

It should be understood that the controller 201 can detect which driver or drivers themselves are faulty, and in some embodiments, the controller 201 also can detect which power component or power components connected following the drivers 1 to N are faulty. For example, referring to FIG. 1A, a driver on a gate driver board can detect that a power component that is on a power board and connected to the driver is faulty, and give an alarm by pulling down a fault terminal of the driver. The fault terminal may be, for example, a drain terminal, connected to a resistor 1, of the driver 1 shown in FIG. 3A. When the driver 1 pulls down the drain terminal thereof, the controller 201 also receives a corresponding fault signal $I_{fault}$.

It should be noted that, for the purpose of conciseness, the following embodiments only describe a case in which a driver itself is faulty. Those skilled in the art understand how to implement the embodiments when a power component connected to the driver is faulty.

It should also be noted that the reference voltage refers to a voltage value, across the first node 203, that is measured during initialization of the driver device 200 and when the voltage divider loop 205 and the plurality of drivers are in normal working state. For example, the voltage divider loop 205 connected to the drivers 1 to N is arranged so that the controller 201 receives, when one or more of the drivers are faulty, a fault signal $I_{fault}$ having a corresponding voltage value, and determines which driver or drivers are faulty by comparing the voltage value of the fault signal with the reference voltage.

In some examples, a table may be stored on the controller 201 (e.g., the controller 201 may contain the table), and the table includes a voltage value or voltage values across the node 203 and one or more drivers, where the voltage value or the voltage values are measured when the one or more drivers in the plurality of drivers are faulty. The controller 201 may look up the table based on the voltage value of a fault signal $I_{fault}$ (e.g., a voltage signal received from the node 203), so as to determine which driver or drivers are faulty.

It should be understood that each voltage value included in the table may change within a predetermined range between an upper voltage limit and a lower voltage limit due to an error and different specifications of resistors and/or power supplies.

Various embodiments of the driver device 200 are described below in detail in conjunction with FIGS. 3A to 6B. It should be noted that a quantity of drivers included in the driver device shown in the drawings is merely an example, and the scope of the present disclosure is not limited thereto, but more or fewer drivers may be arranged as needed.

Figure 3A:
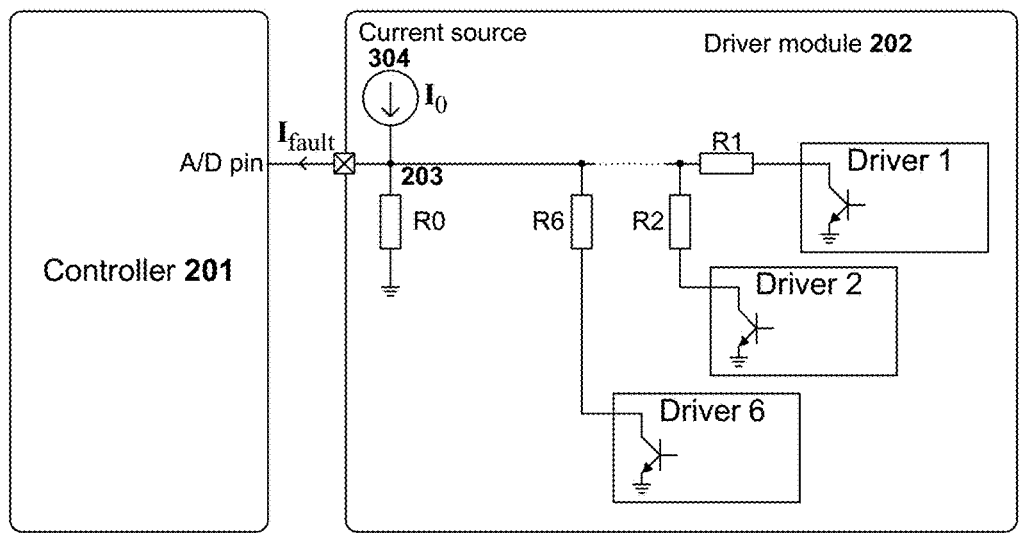
FIG. 3A is a circuit diagram of a driver device according to an embodiment.

In the embodiment illustrated in FIG. 3A, the voltage divider loop in FIG. 2 includes a pull-down resistor R0 and resistors R1 to R6 (only the resistors R1, R2, and R6 are shown for conciseness), and the power supply 204 in FIG. 2 is a current source 304. As shown in FIG. 3A, the drivers 1 to 6 (only the drivers 1, 2, and 6 are shown for conciseness) have one terminal connected to ground and the other terminal connected to the node 203 via their respective corresponding resistors R1 to R6, and the pull-down resistor R0 has one terminal connected to ground and the other terminal connected to the current source 304 via the node 203. In this embodiment, resistance values of the resistors R1 to R6 may be different from each other. Because a resistor connected to a driver has a different resistance value from a resistor connected to another driver, the controller 201 may determine which driver or drivers are faulty based on the voltage value of the fault signal received at the A/D pin.

It should be noted that although the drivers are shown in the drawings as insulated gate bipolar transistors (IGBT) with emitters of the drivers connected to ground and collectors connected to respective resistors, the scope of the present disclosure is not limited thereto, and any other type of transistor capable of implementing the same functions may be used, such as but not being limited to a field-effect transistor (FET), a metal-oxide-semiconductor field-effect transistor (MOSFET), a junction field-effect transistor (JFET), a double gate MOSFET, and the like.

Figure 3B:
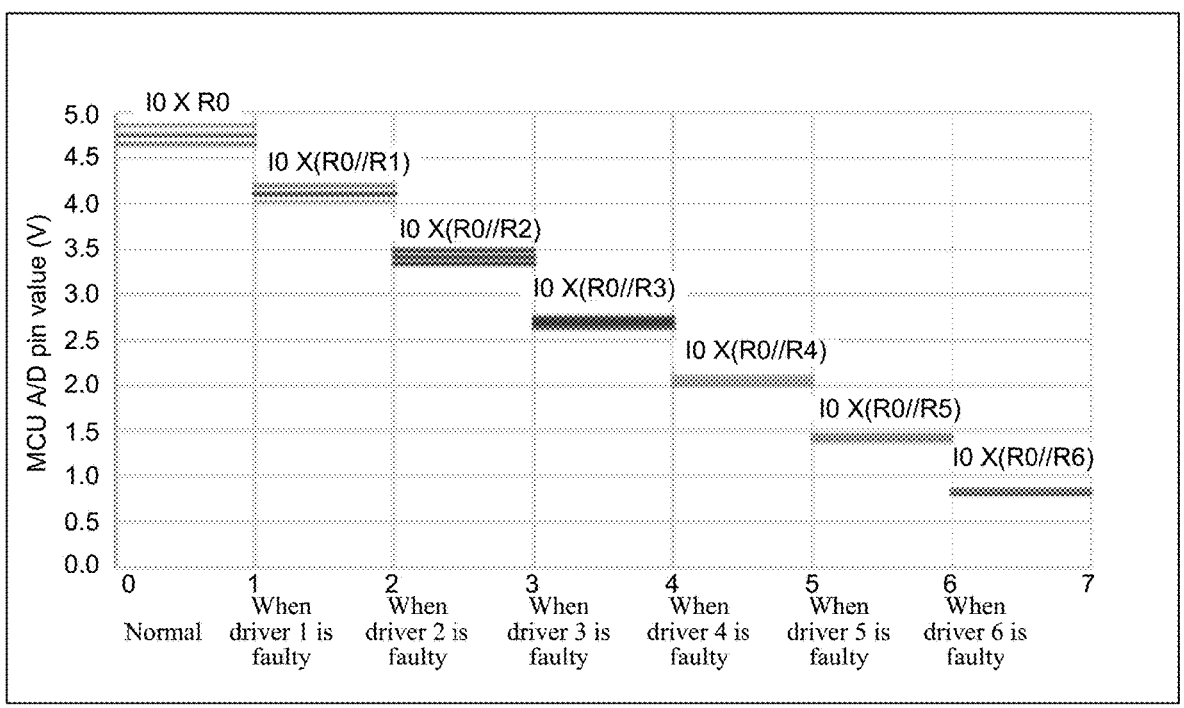
FIG. 3B shows voltage values of voltage signals received by an MCU board when the drivers in FIG. 3A are faulty and corresponding to the faulty drivers.

FIG. 3B shows voltage values of corresponding fault signals $I_{fault}$ received by the controller 201 at the A/D pin from the node 203 when the drivers in FIG. 3A are faulty. The controller 201 may detect which driver or drivers are faulty based on a reference voltage and the voltage value of the received fault signal $I_{fault}$.

As shown in FIG. 3B, in the embodiment illustrated in FIG. 3A, the reference voltage is I0×R0. When the driver 1 is faulty, the voltage value of the fault signal $I_{fault}$ received by the controller 201 at the A/D pin is I0×(R0//R1), where R0//R1 indicates a parallel resistance value of the resistors R0 and R1. When the driver 2 is faulty, the voltage value of the fault signal $I_{fault}$ received by the controller 201 at the A/D pin is I0×(R0//R2), and so on.

It should be understood that a driver is in a turn-off state when the driver is faulty.

It should also be understood that in each state, namely, a normal state, when the driver 1 is faulty, when the driver 2 is faulty, and the like, the voltage value at the A/D pin may change within a certain range due to an error and different specifications of the various resistors and constant current sources.

Table 1 below gives an example of a table contained in the controller 201 according to the embodiment of FIG. 3A.

TABLE 1

| Parameter | Minimum value | Standard value | Maximum value | Unit | Tolerance |
|---|---|---|---|---|---|
| I0 | 0.998 | 1 | 1.002 | mA | 0% |
| R0 | 4.655 | 4.75 | 4.845 | kΩ | 2% |
| R1 | 0.98 | 1 | 1.02 | kΩ | 2% |
| R2 | 1.96 | 2 | 2.04 | kΩ | 2% |
| R3 | 3.528 | 3.6 | 3.672 | kΩ | 2% |
| R4 | 6.076 | 6.2 | 6.324 | kΩ | 2% |

TABLE 1-continued

| Parameter | Minimum value | Standard value | Maximum value | Unit | Tolerance |
|---|---|---|---|---|---|
| R5 | 11.858 | 12.1 | 12.342 | kΩ | 2% |
| R6 | 29.4 | 30 | 30.6 | kΩ | 2% |
| Vadc.R0 | 4.646 | 4.750 | 4.855 | V | 2.20% |
| Vadc.R0//R1 | 0.808 | 0.826 | 0.844 | V | 2.20% |
| Vadc.R0//R2 | 1.377 | 1.407 | 1.438 | V | 2.20% |
| Vadc.R0//R3 | 2.003 | 2.048 | 2.093 | V | 2.20% |
| Vadc.R0//R4 | 2.630 | 2.689 | 2.749 | V | 2.20% |
| Vadc.R0//R5 | 3.336 | 3.411 | 3.486 | V | 2.20% |
| Vadc.R0//R6 | 4.011 | 4.101 | 4.191 | V | 2.20% |

It can be seen from the above table 1 that the current I0 of the current source 304 has a value range of 0.998 mA to 1.002 mA, and the resistors R0 to R6 also have respective value ranges. Therefore, the voltage value of the fault signal $I_{fault}$ received by the controller 201 at the A/D pin also changes within a range. For example, when the driver 2 is faulty, the voltage value of the fault signal $I_{fault}$ varies from 1.377 V to 1.438 V. In other words, as long as the voltage value of the fault signal $I_{fault}$ received by the controller 201 falls between 1.377 V and 1.438 V, it is determined that the driver 2 is faulty.

In an example, the controller 201 may look up the table based on the voltage value of the fault signal $I_{fault}$, so as to determine which driver or drivers are faulty. In an example, looking up the table based on the voltage value of the fault signal $I_{fault}$ may comprise comparing the voltage value of the fault signal $I_{fault}$ with voltage value ranges indicated by the table to determine a voltage value range, of the table, that comprises the voltage value of the fault signal $I_{fault}$. A faulty driver may be identified based upon the voltage value range that comprises the voltage value of the fault signal $I_{fault}$. In an example in which the voltage value of the fault signal $I_{fault}$ is 3.405, it may be determined that driver 5 is faulty based upon a determination that 3.405 is within a voltage value range (e.g., 3.336 to 3.486), of the table, that is reflective of the driver 4 being faulty.

It should be understood that although FIG. 3B and above table 1 only show, for the purpose of conciseness, corresponding voltage values when one driver is faulty, voltage values of corresponding fault signals $I_{fault}$ may be calculated based on the same principle when two or more drivers are faulty. For example, when the drivers 2 and 3 are both faulty, the voltage value of the corresponding fault signal $I_{fault}$ is I0×(R0//R2//R3), where R0//R2//R3 indicates a parallel resistance value of the resistors R0, R2, and R3. The voltage value of the fault signal $I_{fault}$ received when more than two drivers are simultaneously faulty is also saved in the table of the controller 201 together with the corresponding faulty drivers.

Figure 4A:
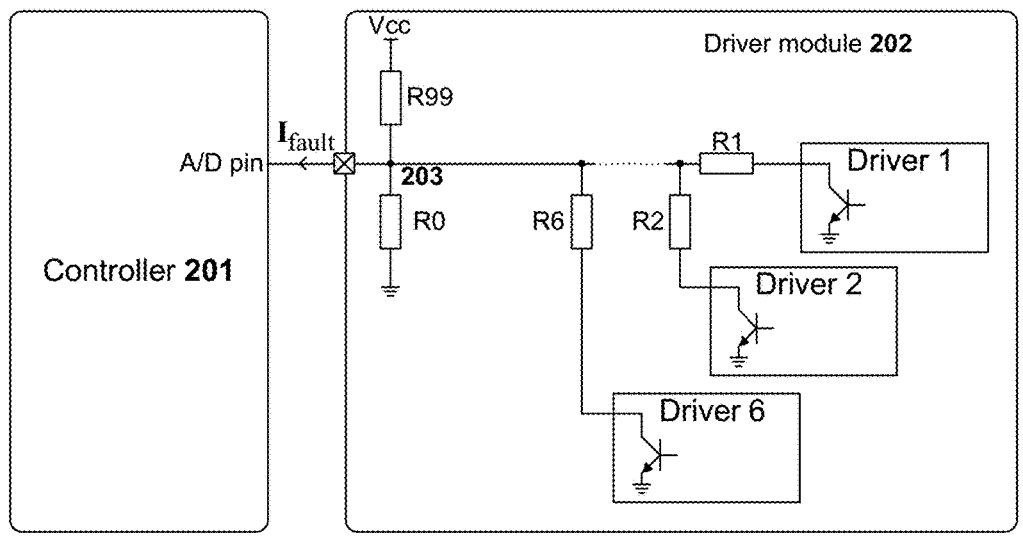
FIG. 4A is a circuit diagram of a variation of a driver module in FIG. 3A.
Figure 4B:
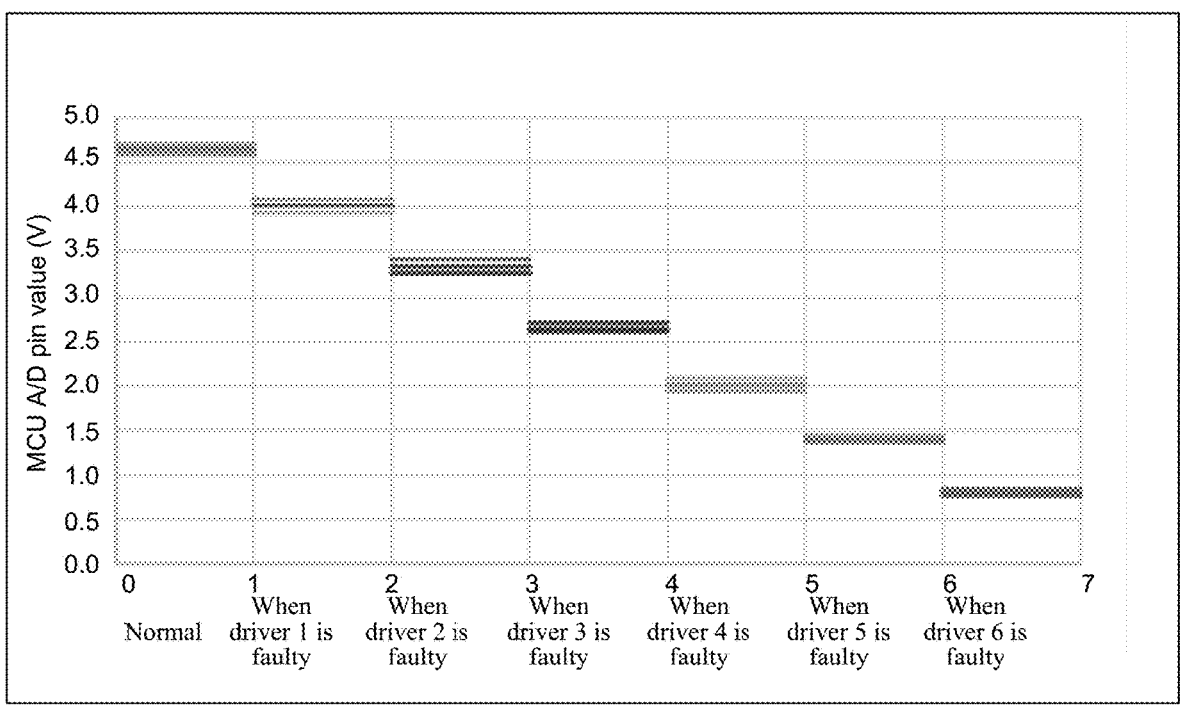
FIG. 4B shows voltage values of voltage signals received by an MCU board when the drivers in FIG. 4A are faulty and corresponding to the faulty drivers.

FIG. 4A shows a variation of the driver module 202 of FIG. 3A. The driver module 202 shown in FIG. 4A is substantially the same as that shown in FIG. 3A, except that the current source 304 in FIG. 3A is replaced by a voltage source Vcc and a pull-up resistor R99. FIG. 4B shows voltage values of corresponding fault signals $I_{fault}$ received by the controller 201 at the A/D pin from the node 203 when the drivers in FIG. 4A are faulty.

In this embodiment, because the current source 304 in FIG. 3A is replaced by the voltage source Vcc and the pull-up resistor R99, a calculation manner of the reference voltage is different from that illustrated in FIG. 3A. The reference voltage in FIG. 4A is VccxR0/(R99+R0). In addition, a calculation manner of the voltage values of the fault signals $I_{fault}$ received by the controller 201 at the A/D pin is also different from that illustrated in FIG. 3A. For example, when the driver 1 is faulty, the voltage value of the fault signal $I_{fault}$ received by the controller 201 at the A/D pin is VccxR1//R0/(R99+R1//R0), where R0//R1 indicates a parallel resistance value of the resistors R0 and R1. When the driver 2 is faulty, the voltage value of the fault signal $I_{fault}$ received by the controller 201 at the A/D pin is VccxR2//R0/(R99+R2//R0), and so on.

It should be understood that in the embodiment illustrated in FIG. 4A, when two or more drivers are simultaneously faulty, for example, when the drivers 2 and 3 are both faulty, the voltage value of the fault signal $I_{fault}$ received at the A/D pin is VccxR2//R3//R0/(R99+R2//R3//R0).

It should also be understood that the table, contained in the controller 201, corresponding to the embodiment illustrated in FIG. 4A is substantially the same as table 1, except that the value range of I0 is replaced by a value range of Vcc and a value range of R99.

Figure 5A:
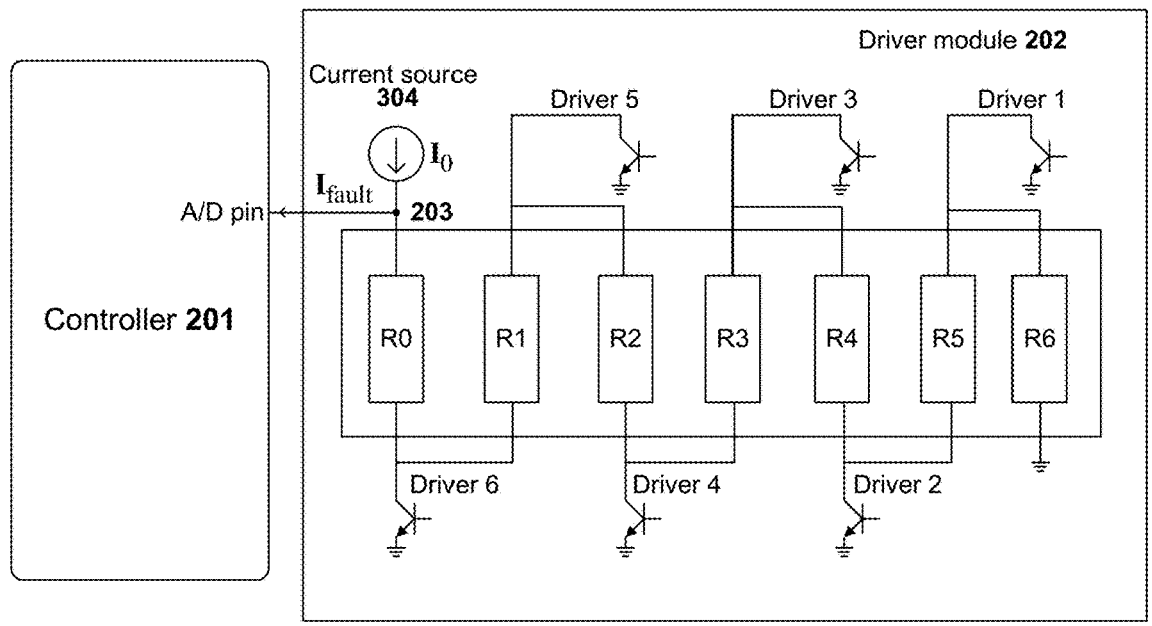
FIG. 5A is a circuit diagram of a driver device according to an embodiment.

FIG. 5A is a circuit diagram of a driver device according to an embodiment. As shown in FIG. 5A, the voltage divider loop 205 in FIG. 2 comprises (e.g., consists of) a resistor array including R0 to R6. The resistors R0 to R6 are sequentially connected in series and have about a same resistance value. One terminal of an initial resistor R0 in the resistor array (e.g., sequentially the first resistor R0 in the resistor array) is connected to the current source 304 via the node 203 and the other terminal is connected in series to the resistor R1, and one terminal of a last resistor R6 (e.g., sequentially the last resistor R6 in the resistor array) is connected in series to the resistor R5 and the other terminal is connected to ground. Respective emitters of the drivers 1 to 6 are connected to ground. A collector of each of the drivers 1 to 6 is connected between a corresponding pair of resistors in the resistor array, for example, the collector of the driver 1 is connected between the resistors R5 and R6, the collector of the driver 2 is connected between the resistors R4 and R5, the collector of the driver 3 is connected between the resistors R3 and R4, and so on.

Figure 5B:
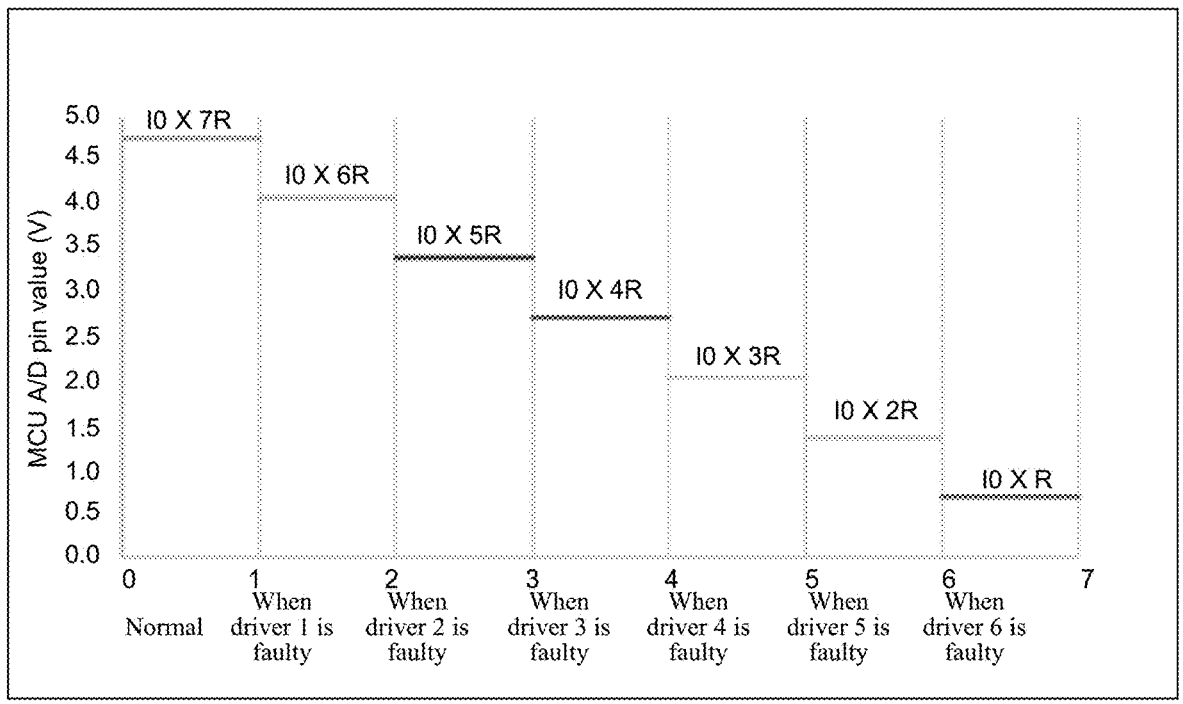
FIG. 5B shows voltage values of voltage signals received by an MCU board when the drivers in FIG. 5A are faulty and corresponding to the faulty drivers.

As shown in FIG. 5B, in the embodiment illustrated in FIG. 5A, the reference voltage is I0×7R. When the driver 1 is faulty, the voltage value of the fault signal $I_{fault}$ received by the controller 201 at the A/D pin is I0×6R. When the driver 2 is faulty, the voltage value of the fault signal $I_{fault}$ received by the controller 201 at the A/D pin is I0×5R, and so on.

It should be understood that voltage values in various states shown in FIG. 5B do not have a floating range, because parameters of each resistor in the resistor array are the same, so that a variation in the voltage values is small and can be negligible.

It should also be understood that, although having the advantages of simple installation and a reduced device size, the embodiment illustrated in FIG. 5A can only determine one faulty driver, compared to the embodiment illustrated in FIG. 3A that can determine two or more drivers that are faulty simultaneously.

Figure 6A:
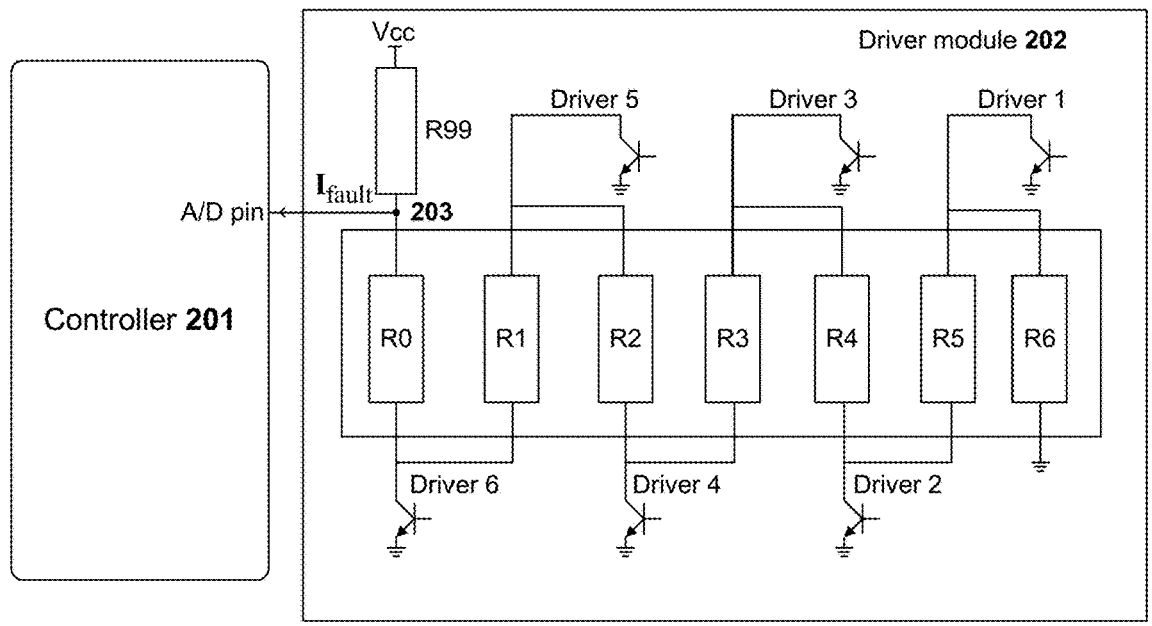
FIG. 6A is a circuit diagram of a variation of a driver module in FIG. 5A.
Figure 6B:
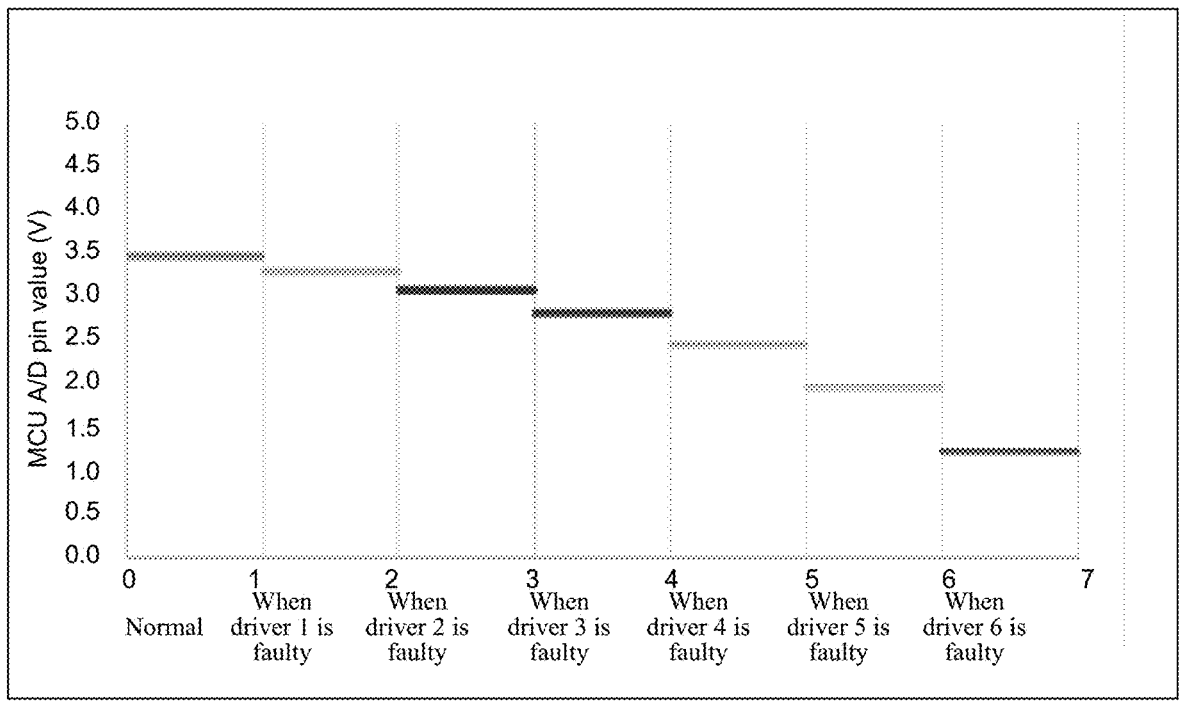
FIG. 6B shows voltage values of voltage signals received by an MCU board when the drivers in FIG. 6A are faulty and corresponding to the faulty drivers.

FIG. 6A shows a variation of the driver module 202 in FIG. 5A. The driver module 202 shown in FIG. 6A is substantially the same as that shown in FIG. 5A, except that the current source 304 in FIG. 5A is replaced by a voltage source Vcc and a pull-up resistor R99. FIG. 6B shows voltage values of corresponding fault signals $I_{fault}$ received by the controller 201 at the A/D pin from the node 203 when the drivers in FIG. 6A are faulty.

In this embodiment, because the current source 304 in FIG. 5A is replaced by the voltage source Vcc and the pull-up resistor R99, a calculation manner of the reference voltage is different from that illustrated in FIG. 5A. The reference voltage of FIG. 6A is Vcc×7R/(7R+R99). In addition, a calculation manner of the voltage values of the fault signals $I_{fault}$ received by the controller 201 at the A/D pin is also different from that illustrated in FIG. 5A. For example, when the driver 1 is faulty, the voltage value of the fault signal $I_{fault}$ received by the controller 201 at the A/D pin is Vcc×6R/(6R+R99), when the driver 2 is faulty, the voltage value of the fault signal $I_{fault}$ received by the controller 201 at the A/D pin is Vcc×5R/(5R+R99), and so on.

The various embodiments of the driver device described above in conjunction with FIGS. 2 to 6B make it possible to detect, in a simple and cost-effective manner, which driver or drivers in the driver device are faulty, or which power component or power components connected following the driver or drivers are faulty.

Figure 7:
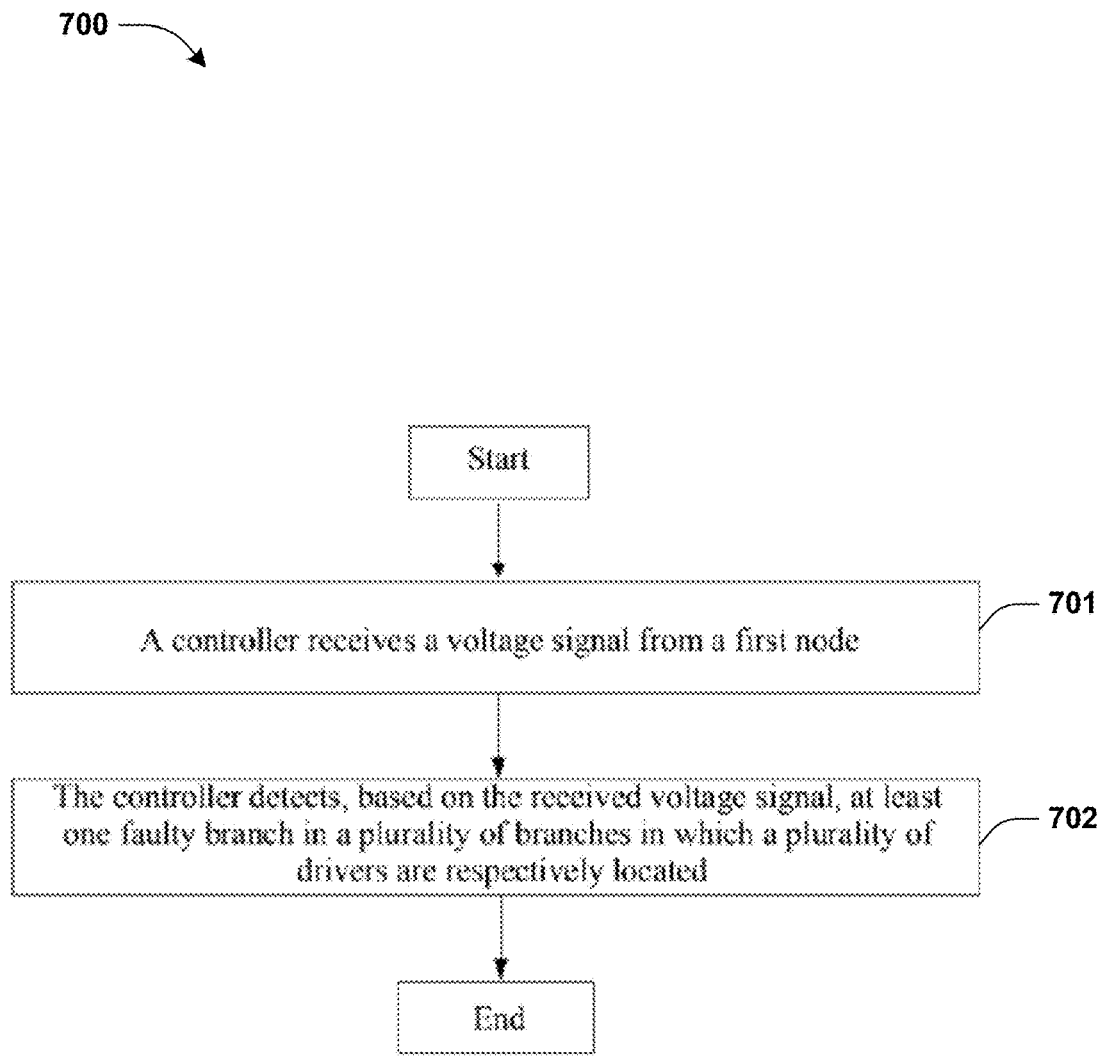
FIG. 7 is a flowchart of a method for monitoring a driver device according to an embodiment of the present disclosure.

FIG. 7 is a flowchart of a method 700 for monitoring a driver device according to an embodiment of the present disclosure. The method 700 shown in FIG. 7 is described below in conjunction with FIGS. 2 to 6B.

First, in act 701, a controller receives a voltage signal from a first node. In this embodiment, for example, the controller 201 may receive the fault signal $I_{fault}$ at the A/D pin from the node 203.

In act 702, the controller detects, based on the received voltage signal, at least one faulty branch in a plurality of branches in which a plurality of drivers are respectively located. Act 702 may be performed after act 701.

As previously described, a fault of the branch may comprise a fault of a driver in the branch, and/or a fault of a power component connected following the driver in the branch. For the purpose of conciseness, only the case that the driver itself is faulty is described below.

For example, in this embodiment, the controller 201 may compare the voltage value of the received fault signal $I_{fault}$ with a reference voltage to determine which driver or drivers are faulty. It should be understood that the reference voltage is based on a voltage value across the first node 203 measured during initialization of the driver device 200 and when the voltage divider loop 205 and the plurality of drivers are in normal working state.

In some examples, the controller 201 detects which driver or drivers are faulty based on a difference between the reference voltage and the voltage value of the fault signal $I_{fault}$ or a predetermined range of the difference. It should be understood that the predetermined range is obtained due to an error and different specifications of the resistors and/or constant current sources.

In some examples, a table is stored on the controller 201 (e.g., the controller 201 contains the table). The controller 201 determines which driver or drivers are faulty by looking up the table based on the voltage value of the received fault signal $I_{fault}$. The table includes voltage values across the node 203 measured when one or more drivers in the plurality of drivers are faulty and corresponding faulty drivers, and each voltage value included in the table may include a corresponding upper voltage limit and lower voltage limit.

In the embodiment illustrated in FIG. 3A, when at least one of the plurality of drivers is faulty, the voltage value of the fault signal $I_{fault}$ received by the controller 201 is dependent on a parallel resistance value of the pull-down resistor R0 and a resistor corresponding to the faulty driver that are in the voltage divider loop 205.

In the embodiment illustrated in FIG. 4A, when at least one of the plurality of drivers is faulty, the voltage value of the fault signal $I_{fault}$ received by the controller 201 is dependent on a resistance value of the pull-up resistor R99 in the voltage divider loop 205 and a parallel resistance value of the pull-down resistor R0 and a resistor corresponding to the faulty driver.

In the embodiment illustrated in FIG. 5A, when one of the plurality of drivers is faulty, the voltage value of the fault signal $I_{fault}$ received by the controller 201 is dependent on a quantity of resistors in the voltage divider loop 205 that are connected in series and connected to the faulty driver.

In the embodiment illustrated in FIG. 6A, when one of the plurality of drivers is faulty, the voltage value of the fault signal $I_{fault}$ received by the controller 201 is dependent on the resistance value of the pull-up resistor R99 in the voltage divider loop 205 and a quantity of resistors that are connected in series and connected to the faulty driver.

It should be noted that the terms "include", "comprise", or any other variants thereof are intended to cover a non-exclusive inclusion, such that a process, a method, an article, or a device that includes a list of elements not only includes those elements but also includes other elements that are not expressly listed, or further includes elements inherent to such process, method, article, or device. Moreover, if no more limitations are made, an element limited by "comprising a/an . . . " does not exclude other identical elements existing in the process, the method, the article, or the device that includes the elements.

It should also be noted that in the described embodiments, any direct electrical connection or coupling between elements, namely, a connection or coupling without an intermediate element, may be replaced by an indirect connection or coupling, namely, a connection or coupling including one or more additional intermediate elements, and vice versa, as long as the general purpose of the connection or coupling is substantially maintained, for example, to provide some kind of signal, some kind of information, or some kind of control. In other words, connections and couplings may be modified as long as the general purposes and functions of the connections or couplings remains substantially unchanged.

At least some embodiments are defined by the examples presented below.

Example 1

A driver device, including:
a controller; and
a driver module including a voltage divider loop and a plurality of drivers, where the voltage divider loop includes a pull-down resistor and one or more corresponding resistors connected to each driver of the plurality of drivers, where the pull-down resistor and the one or more corresponding resistors are coupled to a power supply via a first node, and the first node is coupled to the controller.

Example 2

The driver device according to example 1, where the controller detects, based on a voltage signal received from the first node, whether branches in which the plurality of drivers are respectively located are in normal working state.

Example 3

The driver device according to example 2, where the controller detects, based on the received voltage signal, at least one faulty branch in the branches in which the plurality of drivers are respectively located.

Example 4

The driver device according to example 3, where a fault of the at least one faulty branch includes: a fault of a driver on the at least one faulty branch, or a fault of another component (e.g., a component other than the driver) that is on the branch, wherein the another component and/or the branch are coupled to the driver.

Example 5

The driver device according to example 4, where the controller detects the at least one faulty branch based on a reference voltage and a voltage value of the received voltage signal, where the reference voltage is based on a voltage value across the first node, and where the voltage value across the first node is measured during initialization of the driver device and when the voltage divider loop and the plurality of drivers are in normal working state.

Example 6

The driver device according to example 4, where the controller detects the at least one faulty branch based on a difference between the reference voltage and the voltage value of the received voltage signal or a predetermined range of the difference.

Example 7

The driver device according to example 4, where a table is stored on the controller (e.g., the controller contains the table), and the table includes a voltage value across the first node and a branch in which a driver of the plurality of drivers is located, and where the voltage value across the first node and the branch is measured when the branch is faulty.

Example 8

The driver device according to example 7, where each voltage value included in the table is able to change within a predetermined range between an upper voltage limit and a lower voltage limit.

Example 9

The driver device according to example 7, where the controller determines the at least one faulty branch by looking up the table based on the voltage value of the received voltage signal.

Example 10

The driver device according to example 7, where the table further includes a voltage value across the first node and branches in which two or more drivers of the plurality of drivers are located, and wherein the voltage value across the first node and the branches is measured when the branches are faulty.

Example 11

The driver device according to any one of examples 1 to 10, where the one or more corresponding resistors comprise a plurality of sets of corresponding resistors. For each driver of the plurality of drivers, the plurality of sets of corresponding resistors comprises a set of one or more corresponding resistors connected to the driver. A first terminal (e.g., one terminal) of a first set of one or more corresponding resistors of the plurality of sets of corresponding resistors is connected to a first terminal of a corresponding driver in the plurality of drivers and a second terminal (e.g., one terminal) of the first set of one or more corresponding resistors is connected to the first node. A second terminal of the corresponding driver in the plurality of drivers is coupled to ground.

Example 12

The driver device according to example 11, where a resistance value of the first set of one or more corresponding resistors connected to the corresponding driver of the plurality of drivers is different from a resistance value of a second set of one or more corresponding resistors (of the plurality of sets of corresponding resistors, for example) connected to a second driver of the plurality of drivers.

Example 13

The driver device according to example 12, where when a branch in which at least one driver of the plurality of drivers is located is faulty, a voltage value of a voltage signal received by the controller from the first node is dependent on a parallel resistance value of the pull-down resistor and a set of one or more corresponding resistors, of the plurality of sets of corresponding resistors, connected to the at least one driver.

Example 14

The driver device according to any one of examples 1 to 9, where the pull-down resistor and the one or more corresponding resistors comprise (e.g., consist of) a resistor array, and resistors in the resistor array (e.g., all resistors in the resistor array) are connected in series and have about a same resistance value, where a terminal (e.g., one terminal) of an initial resistor in the resistor array (e.g., sequentially the first resistor in the resistor array) is connected to the first node and a terminal (e.g., one terminal) of a last resistor in the resistor array (e.g., sequentially the last resistor in the resistor array) is coupled to ground, and each driver of the plurality of drivers comprises a first terminal connected between a corresponding pair of resistors in the resistor array and a second terminal coupled to ground.

Example 15

The driver device according to example 14, where when a branch in which a driver (e.g., one driver) of the plurality of drivers is located is faulty, a voltage value of a voltage signal received by the controller from the first node is dependent on a quantity of resistors in the resistor array that are connected in series and connected to the driver.

Example 16

The driver device according to any one of examples 1 to 10, where the power supply is a constant current source, and the constant current source is connected to the first node.

Example 17

The driver device according to any one of examples 1 to 10, where the power supply is a voltage source, and the voltage divider loop further includes a pull-up resistor, and the first node is coupled to the voltage source via the pull-up resistor.

Example 18

A power supply device, including:
a driver device according to any one of examples 1 to 17; and
a power module, driven by a control signal provided by the controller to supply power to a load.

Example 19

A method for monitoring a driver device according to any one of examples 1 to 17, the method including:
receiving, by a controller, a voltage signal from a first node; and
detecting, by the controller and based on the received voltage signal, at least one faulty branch in a plurality of branches in which a plurality of drivers are respectively located.

Example 20

The method according to example 19, further including: detecting, by the controller based on a reference voltage and a voltage value of the received voltage signal, the at least one faulty branch, where the reference voltage is based on a voltage value across the first node, and where the voltage value across the first node is measured during initialization of the driver device and when a voltage divider loop and the plurality of drivers are in normal working state.

Example 21

The method according to example 20, further including: detecting, by the controller, the at least one faulty branch based on a difference between the reference voltage and the voltage value of the received voltage signal or a predetermined range of the difference.

Example 22

The method according to example 19, further including: determining, by the controller, the at least one faulty branch by looking up, based on a voltage value of the received voltage signal, a table stored in the controller.

Example 23

The method according to example 22, where the table further includes a voltage value across the first node and a branch in which a driver of the plurality of drivers is located, wherein the voltage value across the first node and the branch is measured when the branch is faulty.

Example 24

The method according to example 23, where the table further includes a voltage value across the first node and branches in which two or more drivers of the plurality of drivers are located, and wherein the voltage value across the first node and the branches is measured when the branches are faulty.

Example 25

The method according to example 24, where each voltage value included in the table includes a corresponding upper voltage limit and lower voltage limit.

Example 26

The method according to any one of examples 19 to 25, where when a branch in which at least one of the plurality of drivers is located is faulty, the voltage value of the voltage signal received by the controller is dependent on a parallel resistance value of the pull-down resistor in the voltage divider loop and a set of one or more corresponding resistors connected to the at least one driver.

Example 27

The method according to any one of examples 19 to 25, where when a branch in which a driver (e.g., one driver) of the plurality of drivers is located is faulty, the voltage value of the voltage signal received by the controller is dependent on a quantity of resistors in the voltage divider loop that are connected in series and connected to the driver.

Although embodiments of the present disclosure are described in detail above in conjunction with the accompanying drawings, it should be appreciated that the embodiments described above are merely configured to illustrate and not to limit the present disclosure. For those skilled in the art, various modifications and alterations can be made to the embodiments described above without departing from the spirit or scope of the present disclosure. Therefore, the scope of the present disclosure is defined only by the appended claims and equivalents thereof.

The invention claimed is:
1. A driver device, comprising:
a controller; and
a driver module comprising a voltage divider loop and a plurality of drivers, wherein:
the voltage divider loop of the driver module comprises:
a pull-down resistor; and
one or more corresponding resistors connected to each driver of the plurality of drivers of the driver module;
the pull-down resistor and the one or more corresponding resistors are coupled to a power supply via a first node; and
the first node is coupled to the controller.
2. The driver device as claimed in claim 1, wherein the controller detects, based on a voltage signal received from the first node, whether branches in which the plurality of drivers are respectively located are in normal working state.
3. The driver device as claimed in claim 2, wherein the controller detects, based on the received voltage signal, at least one faulty branch in the branches in which the plurality of drivers are respectively located.
4. The driver device as claimed in claim 3, wherein a fault of the at least one faulty branch comprises at least one of:
a fault of a driver on the at least one faulty branch; or
a fault of a component, other than the driver, that is on the at least one faulty branch and is coupled to the driver.
5. The driver device as claimed in claim 4, wherein the controller detects the at least one faulty branch based on a reference voltage and a voltage value of the received voltage signal, wherein the reference voltage is based on a voltage value across the first node, and wherein the voltage value across the first node is measured during initialization of the driver device and when the voltage divider loop and the plurality of drivers are in normal working state.

6. The driver device as claimed in claim 5, wherein the controller detects the at least one faulty branch based on a difference between the reference voltage and the voltage value of the received voltage signal or a predetermined range of the difference.

7. The driver device as claimed in claim 4, wherein a table is stored on the controller, and the table comprises a voltage value across the first node and a branch in which a driver of the plurality of drivers is located, and wherein the voltage value across the first node and the branch is measured when the branch is faulty.

8. The driver device as claimed in claim 7, wherein each voltage value in the table is able to change within a predetermined range between an upper voltage limit and a lower voltage limit.

9. The driver device as claimed in claim 7, wherein the controller determines the at least one faulty branch by looking up the table based on the voltage value of the received voltage signal.

10. The driver device as claimed in claim 7, wherein the table comprises a voltage value across the first node and branches in which two or more drivers of the plurality of drivers are located, and wherein the voltage value across the first node and the branches in which the two or more drivers are located is measured when the branches in which the two or more drivers are located are faulty.

11. The driver device as claimed in claim 1, wherein:
the one or more corresponding resistors comprise a plurality of sets of corresponding resistors;
for each driver of the plurality of drivers, the plurality of sets of corresponding resistors comprises a set of one or more corresponding resistors connected to the driver;
a first terminal of a first set of one or more corresponding resistors of the plurality of sets of corresponding resistors is connected to a first terminal of a corresponding driver in the plurality of drivers and a second terminal of the first set of one or more corresponding resistors is connected to the first node; and
a second terminal of the corresponding driver in the plurality of drivers is coupled to ground.

12. The driver device as claimed in claim 11, wherein a resistance value of the first set of one or more corresponding resistors connected to the corresponding driver of the plurality of drivers is different from a resistance value of a second set of one or more corresponding resistors connected to a second driver of the plurality of drivers.

13. The driver device as claimed in claim 12, wherein when a branch in which at least one driver of the plurality of drivers is located is faulty, a voltage value of a voltage signal received by the controller from the first node is dependent on a parallel resistance value of the pull-down resistor and a set of one or more corresponding resistors, of the plurality of sets of corresponding resistors, connected to the at least one driver.

14. The driver device as claimed in claim 1, wherein:
the pull-down resistor and the one or more corresponding resistors comprise a resistor array;
resistors in the resistor array are connected in series and have about a same resistance value;
a terminal of an initial resistor in the resistor array is connected to the first node and a terminal of a last resistor in the resistor array is coupled to ground; and
each driver of the plurality of drivers comprises:
a first terminal connected between a corresponding pair of resistors in the resistor array; and
a second terminal coupled to ground.

15. The driver device as claimed in claim 14, wherein when a branch in which a driver of the plurality of drivers is located is faulty, a voltage value of a voltage signal received by the controller from the first node is dependent on a quantity of resistors in the resistor array that are connected in series and connected to the driver.

16. The driver device as claimed in claim 1, wherein the power supply is a constant current source, and the constant current source is connected to the first node.

17. The driver device as claimed in claim 1, wherein the power supply is a voltage source, and that the voltage divider loop comprises a pull-up resistor, and the first node is coupled to the voltage source via the pull-up resistor.

18. A power supply device, comprising:
a driver device comprising:
a controller; and
a driver module comprising a voltage divider loop and a plurality of drivers, wherein:
the voltage divider loop of the driver module comprises:
a pull-down resistor; and
one or more corresponding resistors connected to each driver of the plurality of drivers of the driver module;
the pull-down resistor and the one or more corresponding resistors are coupled to a power supply via a first node; and
the first node is coupled to the controller; and
a power module driven by a control signal provided by the controller to supply power to a load.

19. A method for monitoring a driver device comprising:
a controller; and
a driver module comprising a voltage divider loop and a plurality of drivers, wherein:
the voltage divider loop of the driver module comprises:
a pull-down resistor; and
one or more corresponding resistors connected to each driver of the plurality of drivers of the driver module;
the pull-down resistor and the one or more corresponding resistors are coupled to a power supply via a first node; and
the first node is coupled to the controller,
the method comprising:
receiving, by the controller, a voltage signal from the first node; and
detecting, by the controller and based on the received voltage signal, at least one faulty branch in a plurality of branches in which the plurality of drivers are respectively located.

20. The method as claimed in claim 19, comprising:
detecting, by the controller and based on a reference voltage and a voltage value of the received voltage signal, the at least one faulty branch, wherein the reference voltage is based on a voltage value across the first node, and wherein the voltage value across the first node is measured during initialization of the driver device and when the voltage divider loop and the plurality of drivers are in normal working state.

21. The method as claimed in claim 19, comprising:
determining, by the controller, the at least one faulty branch by looking up, based on a voltage value of the received voltage signal, a table stored in the controller, wherein the table comprises a voltage value across the first node and a branch in which a driver of the plurality of drivers is located, wherein the voltage value is across the first node and the branch is measured when the branch is faulty.

* * * * *